United States Patent
Sorrentino et al.

(10) Patent No.: US 10,893,533 B2
(45) Date of Patent: Jan. 12, 2021

(54) METHODS OF SCHEDULING TRANSMISSIONS USING TIMING LIMITS AND RELATED WIRELESS COMMUNICATION DEVICES

(71) Applicant: Telefonaktiebolaget LM Ericsson (publ), Stockholm (SE)

(72) Inventors: Stefano Sorrentino, Solna (SE); Hieu Do, Järfälla (SE); Erika Tejedor, Stockholm (SE); Yunpeng Zang, Wuerselen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 64 days.

(21) Appl. No.: 16/320,131

(22) PCT Filed: Aug. 8, 2017

(86) PCT No.: PCT/SE2017/050803
§ 371 (c)(1),
(2) Date: Jan. 24, 2019

(87) PCT Pub. No.: WO2018/030945
PCT Pub. Date: Feb. 15, 2018

(65) Prior Publication Data
US 2020/0229209 A1  Jul. 16, 2020

Related U.S. Application Data

(60) Provisional application No. 62/374,210, filed on Aug. 12, 2016.

(51) Int. Cl.
*H04W 72/12* (2009.01)
*H04W 72/02* (2009.01)
*H04W 92/18* (2009.01)

(52) U.S. Cl.
CPC ....... *H04W 72/1242* (2013.01); *H04W 72/02* (2013.01); *H04W 92/18* (2013.01)

(58) Field of Classification Search
CPC .... H04B 17/318; H04B 17/327; H04B 17/20; H04B 17/24; H04B 17/309; H04B 17/336;
(Continued)

(56) References Cited

U.S. PATENT DOCUMENTS

| | | | |
|---|---|---|---|
| 2015/0036566 A1* | 2/2015 | Blankenship | H04W 72/0413 370/311 |
| 2016/0044694 A1 | 2/2016 | Park | |
| 2016/0128115 A1 | 5/2016 | Panteleev et al. | |

FOREIGN PATENT DOCUMENTS

| | | | |
|---|---|---|---|
| WO | WO 2013/151468 A1 | 10/2013 | |
| WO | WO 2016/025159 A1 | 2/2016 | |
| WO | WO-2016025159 A1 * | 2/2016 | ........... H04L 1/1812 |

OTHER PUBLICATIONS

International Search Report and Written Opinion of the International Searching Authority, PCT/SE2017/050803, dated Oct. 24, 2017, 12 pages.

(Continued)

*Primary Examiner* — Natasha W Cosme
(74) *Attorney, Agent, or Firm* — Sage Patent Group

(57) ABSTRACT

According to some embodiments of inventive concepts, a method may be provided to operate a UE providing sidelink communications with other wireless devices. The method may include scheduling a first transmission from the UE, wherein the first transmission has a first priority. The method may also include scheduling a second transmission from the UE, wherein the second transmission has a second priority, wherein the first priority is greater than the second priority, and wherein the first and second transmissions are scheduled for transmission during a time interval. The method may (Continued)

Layout of European 5.9 GHz ITS band for V2X communication

| 5725 | 5850 | 5855 | 5875 | 5905 | 5925 MHz |
|---|---|---|---|---|---|
| RLAN | | Potential non-safety ITS ECC REC (08)01 | | Safety-ITS EC DEC 2008/671/EC | Possible ITS EC DEC (08)01 | further include transmitting the first transmission during the time interval, and responsive to determining a violation of a timing limit corresponding to scheduling the first and second transmissions during the time interval and responsive to the first priority being greater than the second priority, dropping transmitting the second transmission during the time interval.

19 Claims, 6 Drawing Sheets

(58) Field of Classification Search
CPC .. H04B 17/382; H04B 7/0404; H04B 7/0408; H04B 7/0413; H04B 7/0417; H04B 7/06; H04B 7/0689; H04B 7/0695; H04B 7/088; H04B 7/14; H04B 7/15507; H04B 7/15528; H04B 7/15542; H04B 7/2606
See application file for complete search history.

(56) References Cited

OTHER PUBLICATIONS

Discussion on coexistence of PC5-based V2V operation and lecay Uu operation, LG Electronics, RAN WG1 Meeting #84, St Julian's Malta, Feb. 15-19, 2016, R1-160638, 2 pages.

Intelligent Transport Systems (ITS); Radiocommunications equipment operating in the 5 855 MHz to 5 925 MHz frequency band; Harmonised Standard covering the essential requirements of article 3.2 of Directive 2014/53/EU, Draft ETSI EN 302 571 V2.0.0 (Mar. 2016), 45 Pages.

Definitions, Symbols, Decentralized Congestion Control, and Conformance; Reference 3.1, 3.2, 4.2.10, 4.2.10.1, 4.2.10.2, and 4.2.10.3 ETSI EN 302.571 V2.0.0, 3 Pages.

SLSS/PSBCH and Transmitter Behavior for Sidelink V2V, Ericsson, 3GPP TSG RAN WG1 Meeting #86, Gothenburg, Sweden, Aug. 22-26, 2016, R1-xxxxxx , 4 Pages.

Intelligent Transport Systems (ITS); Cross Layer DCC Management entity for operation in the ITS G5A and ITS G5B medium, ETSI TS 103 175 V1.1.1 (Jun. 2015), Reference DTS/ITS-0020046, 650 Route des Lucioles, F-06921 Sophia Antipolis Cedex—France, 36 Pages.

Outstanding Physical Layer Structure Details and Receiver Behavior for Sidelink V2V,Ericsson, 3GPP TSG RAN WG1 Meeting #86, Gothenburg, Sweden, Aug. 22-26, 2016, R1-166951, 3 Pages.

Congestion Control Framework for V2V, Ericsson, 3GPP TSG RAN WG1 Meeting #86, Gothenburg, Sweden, Aug. 22-26, 2016, R1-166955, 4 Pages.

Distributed Synchronization Procedure for V2X over PC5, 3GPP TSG RAN WG1 Meeting #86, Gothenburg, Sweden, Aug. 22-26, 2016, R1-166960, 6 Pages.

European Search Report and Opinion for European Patent Application No. EP 17839926.7, dated Feb. 25, 2020, 9 pages.

* cited by examiner

V2X Scenarios For An LTE-based NW

Layout of European 5.9 GHz ITS band for V2X communication

METHODS OF SCHEDULING TRANSMISSIONS USING TIMING LIMITS AND RELATED WIRELESS COMMUNICATION DEVICES

CROSS REFERENCE TO RELATED APPLICATIONS

This application is a 35 U.S.C. § 371 national stage application of PCT International Application No. PCT/SE2017/050803 filed on Aug. 8, 2017, which in turns claims domestic priority to U.S. Provisional Patent Application No. 62/374,210, filed on Aug. 12, 2016, the disclosures and content of which are incorporated by reference herein in their entirety.

TECHNICAL FIELD

The present disclosure relates generally to communications, and more particularly to wireless communications and related wireless devices.

BACKGROUND

During Release 12, the LTE (Long Term Evolution) standard has been extended with support of device to device (D2D) (specified as "sidelink") features targeting both commercial and Public Safety applications. Some applications enabled by Rel-12 LTE are device discovery, where devices are able to sense the proximity of another device and associated application by broadcasting and detecting discovery messages that carry device and application identities. Another application consists of direct communication based on physical channels terminated directly between devices.

One of the potential extensions for the device to device work consists of support of V2x communication, which includes any combination of direct communication between vehicles, pedestrians and infrastructure. V2x communication may take advantage of a network NW infrastructure, when available, but at least basic V2x connectivity should be possible even in case of lack of coverage. Providing an LTE-based V2x interface may be economically advantageous because of the LTE economies of scale and it may enable tighter integration between communications with the NW infrastructure (V2I) and V2P and V2V communications, as compared to using a dedicated V2x technology.

FIG. 1 is a schematic diagram illustrating V2X scenarios for an LTE-based Radio Access Network NW. As shown in FIG. 1, V2I (Vehicle to Infrastructure) communications may be provided between a vehicle and the radio access network (RAN), V2V (Vehicle to Vehicle) communications may be provided directly between different vehicles (without communicating through the radio access network), and V2P (Vehicle to Person) communications may be provided directly between a vehicle and a device held by the person (e.g., a smartphone, a tablet computer, etc.). V2X communications are meant to include any/all of V2I, V2P, and V2V communications.

V2x communications may carry both non-safety and safety information, where each of the applications and services may be associated with specific requirements sets, e.g., in terms of latency, reliability, capacity, etc.

The European Telecommunication Standards Institute ETSI has defined two types of messages for road safety: Co-operative Awareness Messages (CAMs) and Decentralized Environmental Notification Messages (DENMs).

CAM: The CAM message is intended to enable vehicles, including emergency vehicles, to notify their presence and other relevant parameters in a broadcast fashion. Such messages target other vehicles, pedestrians, and infrastructure, and are handled by their applications. A CAM message also serves as active assistance to safety driving for normal traffic. The availability of a CAM message is indicatively checked for every 100 ms, yielding a maximum detection latency requirement of <=100 ms for most messages.

DENM: The DENM message is event-triggered, such as by braking, and the availability of a DENM message is also checked for every 100 ms Depending on the use case, latency requirements for CAM and DENM may vary significantly. As an example, latency may vary from 20 ms for pre-crash warnings, to 100 ms for emergency stop, or queue warnings, or 1000 ms for non-safety related use cases such as traffic flow optimization, curve speed warnings, etc.

The package size of CAM and DENM message varies from 100+ to 800+ bytes and a typical size is around 300 bytes depending on the specific V2X use case, message type (e.g., DENM is supposed to be larger than CAM), and on the security format included in the packet (i.e., full certificate or certificate digest). The message is supposed to be detected by all vehicles in proximity.

The SAE (Society of the Automotive Engineers) also defined the Basic Safety Message (BSM) for Dedicated Short Range Communication (DSRC) with various message sizes defined.

According to the importance and urgency of the messages, the BSMs are further classified into different priorities.

In Europe, 7×10 MHz channels are currently designated for Intelligent Transport Systems (ITS) safety-related services in the 5875-5905 MHz band. In addition, 5905-5925 MHz is identified in ECC Decision (08)01 as a potential extension band for ITS and 5855-5875 MHz is recommended to be made available for ITS non-safety related applications through Electronic Communications Committee ECC Recommendation (08)01. ITS services are expected to be primary services deployed on such spectrum. Any other system that wishes allocation as a secondary service would then need to ensure that it gives priority to such a system. On the other hand, non-safety ITS is not of the same priority and it could potentially be co-primary allocated with other services.

FIG. 2 illustrates a layout of the European 5.9 GHz ITS band for V2X communication.

ETSI has developed the harmonized European standard EN 302 571 for ITS equipment that is intended to operate on the 5.9 GHz ITS band in Europe. This harmonized standard specifies regulatory requirements, which are intended to provide/ensure protection of existing services in the 5855-5925 MHz bands and in adjacent bands. Among others, the latest draft of ETSI EN 302 571 [Reference 1] also includes the requirement on decentralized Congestion Control, which is "a mandatory mechanism to be used by the equipment to ensure that the radio channel is not congested by too many transmissions within a certain geographical range. The mechanism is such that the equipment adapts its transmission behavior dynamically based on how occupied the channel is at the moment". [Reference 1]

Approaches described in the Background section could be pursued, but are not necessarily approaches that have been previously conceived or pursued. Therefore, unless otherwise indicated herein, the approaches described in the Background section are not prior art to the inventive embodi-

SUMMARY

According to some embodiments of inventive concepts, a method may be provided to operate a wireless communication device providing sidelink communications with other wireless devices. The method may include scheduling a first transmission from the wireless communication device, wherein the first transmission has a first priority. The method may also include scheduling a second transmission from the wireless communication device, wherein the second transmission has a second priority, wherein the first priority is greater than the second priority, and wherein the first and second transmissions are scheduled for transmission during a time interval. The method may further include transmitting the first transmission during the time interval, and responsive to determining a violation of a timing limit corresponding to scheduling the first and second transmissions during the time interval and responsive to the first priority being greater than the second priority, dropping transmitting the second transmission during the time interval.

According to some other embodiments of inventive concepts, a wireless communication device may include a transceiver configured to provide wireless communication over a radio interface, and a processor coupled to the transceiver. The processor may be configured to schedule a first transmission from the wireless communication device, wherein the first transmission has a first priority. The processor may also be configured to schedule a second transmission from the wireless communication device, wherein the second transmission has a second priority, wherein the first priority is greater than the second priority, and wherein the first and second transmissions are scheduled for transmission during a time interval. The processor may be further configured to transmit the first transmission during the time interval, and to drop transmitting the second transmission during the time interval responsive to determining a violation of a timing limit corresponding to scheduling the first and second transmissions during the time interval and responsive to the first priority being greater than the second priority.

According to still other embodiments of inventive concepts, a wireless communication device may be adapted to schedule a first transmission from the wireless communication device, wherein the first transmission has a first priority. The wireless communication device may be further adapted to schedule a second transmission from the wireless communication device, wherein the second transmission has a second priority, wherein the first priority is greater than the second priority, and wherein the first and second transmissions are scheduled for transmission during a time interval. The wireless communication device may also be adapted to transmit the first transmission during the time interval, and drop transmitting the second transmission during the time interval responsive to determining a violation of a timing limit corresponding to scheduling the first and second transmissions during the time interval and responsive to the first priority being greater than the second priority.

According to yet other embodiments of inventive concepts, a computer program product may include a computer readable storage medium having computer readable program code embodied in the computer readable storage medium. When executed by a processor of a wireless communication device, the computer readable program code may cause the wireless communication device to schedule a first transmission from the wireless communication device, wherein the first transmission has a first priority, and to schedule a second transmission from the wireless communication device, wherein the second transmission has a second priority, wherein the first priority is greater than the second priority, and wherein the first and second transmissions are scheduled for transmission during a time interval. The computer readable program code may further cause the wireless communication device to transmit the first transmission during the time interval, and to drop transmitting the second transmission during the time interval responsive to determining a violation of a timing limit corresponding to scheduling the first and second transmissions during the time interval and responsive to the first priority being greater than the second priority.

According to further embodiments of inventive concepts, a wireless communication device may include first and second scheduling modules, a transmitting module, and a dropping module. The first scheduling module may be configured to schedule a first transmission from the wireless communication device, wherein the first transmission has a first priority. The second scheduling module may be adapted to schedule a second transmission from the wireless communication device, wherein the second transmission has a second priority, wherein the first priority is greater than the second priority, and wherein the first and second transmissions are scheduled for transmission during a time interval. The transmission module may be configured to transmit the first transmission during the time interval. The dropping module may be adapted to drop transmitting the second transmission during the time interval responsive to determining a violation of a timing limit corresponding to scheduling the first and second transmissions during the time interval and responsive to the first priority being greater than the second priority.

By prioritizing some transmissions (e.g., data transmission) relative to other transmissions (e.g., signaling transmissions), congestion control may be more effectively implemented with reduced impact on higher priority transmissions.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 5:
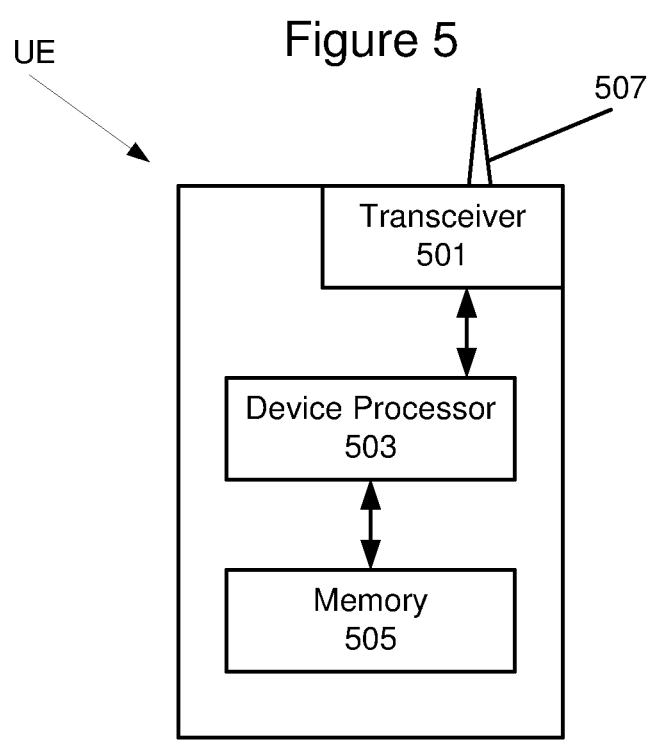
FIG. 5 is a block diagram illustrating a wireless communication device according to some embodiments of inventive concepts.

FIG. 5 is a block diagram illustrating elements of a wireless communication device UE (also referred to as a wireless device, a wireless terminal, a wireless communication terminal, user equipment, or a user equipment node/terminal/device) configured to provide V2X communication according to embodiments of inventive concepts. As shown, wireless communication device UE may include a transceiver circuit 501 (also referred to as a transceiver) including a transmitter and a receiver configured to provide uplink and downlink radio communications with a base station of a radio access network, and to provide V2X sidelink communications directly with other V2X wireless communication devices. Wireless communication device may also include a processor circuit 503 (also referred to as a processor) coupled to the transceiver circuit, and a memory circuit 505 (also referred to as memory) coupled to the processor circuit. The memory circuit 505 may include computer readable program code that when executed by the processor circuit 503 causes the processor circuit to perform operations according to embodiments disclosed herein. According to other embodiments, processor circuit 503 may be defined to include memory so that a separate memory circuit is not required. Wireless communication device UE may also include a interface (such as a user interface) coupled with processor 503, and/or wireless communication device UE may be incorporated in a vehicle.

Congestion control may be important/essential for V2X communication, especially for supporting safety related applications. It may reduce/prevent radio channel congestion resulting from by too many transmissions within a certain geographical area. Congestion control is generally achieved by placing limits on several transmitter parameters based on a channel occupancy level perceived by the transmitter. For example, draft ETSI EN 302 571 V2.0.0 (2016-March) [Reference 1] and [Reference 2] for the 5.9 GHz ITS band in Europe specifies regulatory limits on maximum $T_{on}$, minimum $T_{off}$ and maximum Duty Cycle of UE transmitters based on the channel occupancy level measured as Channel Busy Ratio (CBR), where $T_{on}$ is the duration of a transmission,
$T_{off}$ is the allowed minimum time between two consecutive transmissions, Duty Cycle is the ratio expressed as a percentage of the maximum transmitter "on" time on one carrier frequency, relative to 1 second. [Reference 2]

In LTE-based V2X communications, besides transmitting data packets (often with associated scheduling assignments, SA) each UE also sends out special signals containing generic system parameters (such as system bandwidth, sidelink frame number, the coverage status of the UE, etc.) as well as synchronization information for the decoding of messages. In particular, according to 3GPP Rel-13 sidelink and current discussion for Rel-14 sidelink, a V2X UE is supposed to periodically transmit signaling subframes, e.g., Sidelink Synchronization Signals (SLSS) and Physical Sidelink Broadcast Channel (PSBCH) with a fixed periodicity (e.g., every 200 ms). (Note: SLSS and PSBCH are transmitted in the same subframe.)

It is noted that while the $T_{off}$ limit may be agnostic to the nature of the signals sent by the UE (i.e., $T_{off}$ limit is applicable to all transmissions from a UE, be it data or SLSS/PSBCH signaling) the arrival time of packets from higher layers can be random and uncoordinated with the periodical signaling transmissions. Consequently, the time between a data transmission and a signaling (SLSS/PSBCH) transmission can violate the minimum $T_{off}$ limit in certain cases. For example, if the transmission of SLSS/PSBCH is scheduled within the $T_{off}$ limit following the end of a data transmission, or if a data transmission is scheduled to start within the $T_{off}$ limit following an SLSS/PSBCH transmission, a violation may occur as illustrated in FIG. 3.

Figure 1:
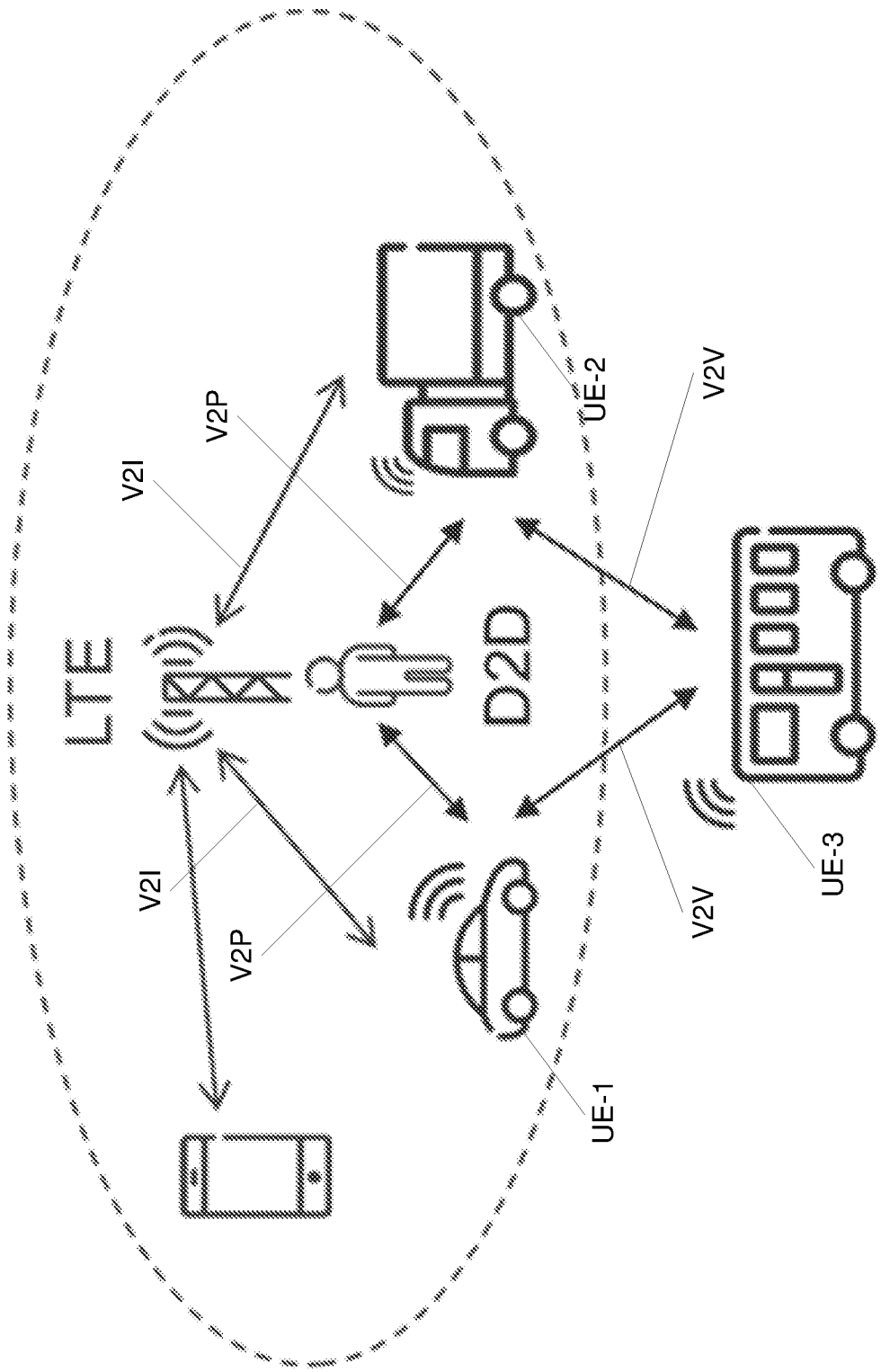
FIG. 1 is a schematic diagram illustrating communication scenarios using sidelink V2X communications within a coverage area of an LTE-based radio access network NW.
Figure 2:
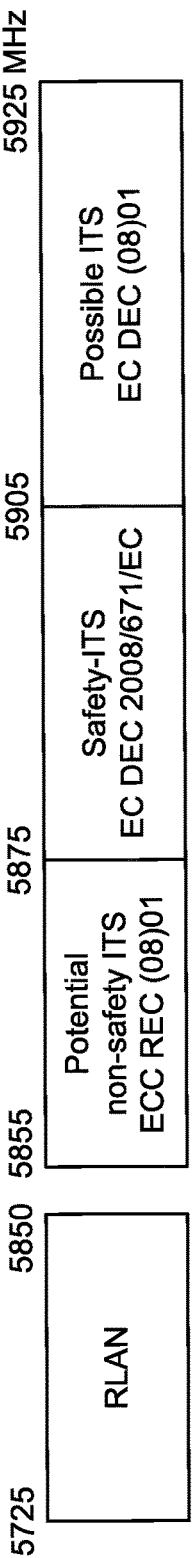
FIG. 2 is a block diagram illustrating a layout of European 5.9 GHz ITS band for V2X communication.
Figure 3:
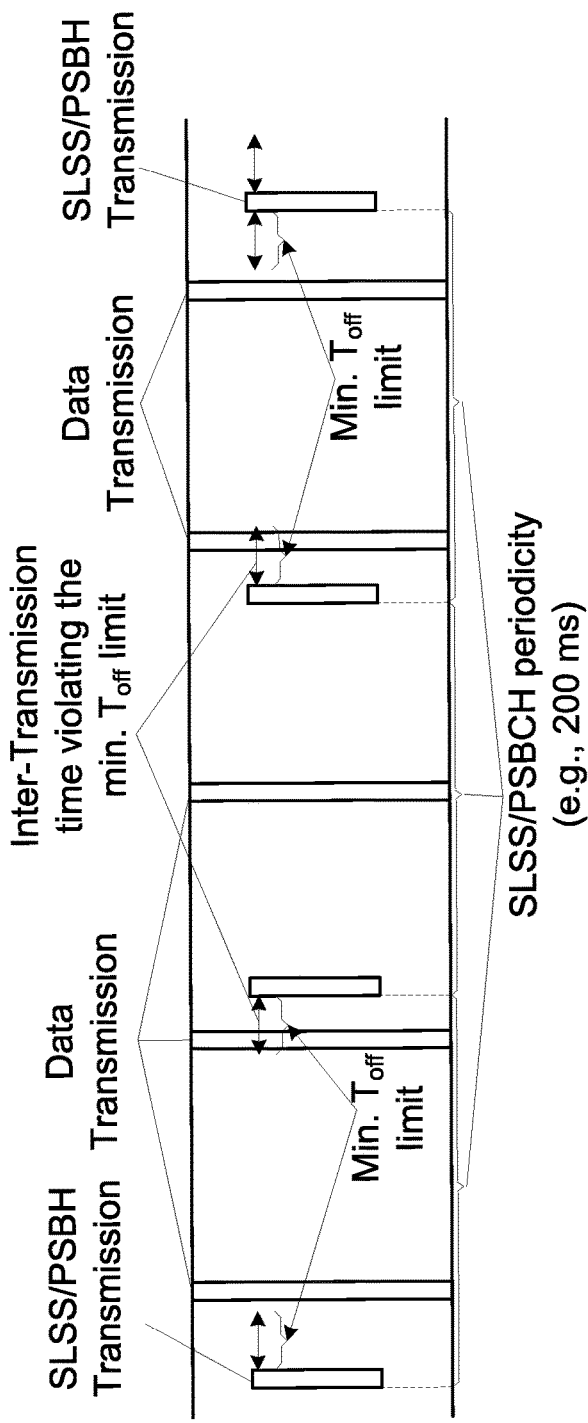
FIG. 3 is a timing diagram illustrating data and signaling transmissions that violate $T_{off}$ limit set by congestion control.

FIG. 3 is a timing diagram illustrating data transmissions and signaling transmissions that violate the $T_{off}$ limit set by congestion control.

Violating the minimum $T_{off}$ limit in a regulatory conformance test may prohibit an LTE device from operating on the ITS band in some regions (e.g., in Europe [Reference 1]).

According to some embodiments disclosed herein, a prioritization scheme may give higher priority to data transmission over some signaling transmissions. If a violation to congestion control limits (e.g., the $T_{off}$ limit) is detected, the device may prioritize the data transmission by skipping the signaling transmission.

According to some embodiments disclosed herein, congestion control requirements (e.g., the $T_{off}$ and duty cycle limits) may be satisfied with reduced impact on transmission of V2X data packets in LTE.

Embodiments of inventive concepts will be described in the context of providing V2X/ITS services over a mobile wireless NW. However, embodiments of inventive concepts may thus be applied to any transmitter/receiver device, in the context of sidelink (D2D) transmissions or even in the context of cellular transmissions. Embodiments of inventive concepts may be applicable to LTE or any other wireless standard including 5G.

To correctly detect a signal, a receiver may need to know some information related to the system bandwidth, system frame number, coverage status of the transmitter (e.g., MIB-SL) as well as information of the synchronization reference being used by the transmitter. These types of information are often broadcasted by each UE in the network in a periodic manner (e.g., once every 200 ms). For LTE sidelink communication, the mentioned signaling information is carried in the PSBCH, which includes the SLSS. Due to the repetitiveness of the signaling transmissions, a transmitter UE may at times consider some signaling information (e.g., conveyed by SLSS/PSBCH) as of less importance than a data transmission. Hence, the UE may/shall be able to prioritize the data transmission over such signaling (SLSS/PSBCH) transmissions, in order to meet the $T_{off}$ and duty cycle limits.

In the following discussion, different embodiments of inventive concepts are presented, which may be combined in any way. According to some embodiments, the transmitter may perform the following operations:

determine the $T_{off}$ limit for two consecutive transmissions; determine that
an upcoming periodic signaling transmission is going to occur within $T_{off}$ after its data transmission, or
a data transmission is scheduled within $T_{off}$ following an upcoming periodic signaling information; and
down-prioritize the signaling transmission by skipping the signaling transmission.

According to some other embodiments, the transmitter may perform the following operations:

determine the $T_{off}$ limit for its two consecutive transmissions;
determine that
a second data transmission is scheduled within the minimum $T_{off}$ limit following the end of a first data transmission or a finished signaling transmission; and
reschedule the second data transmission to allow at least the minimum $T_{off}$ limit between the second data transmission and the first data transmission or the already finished signaling transmission.

According to still other embodiments, the transmitter may perform the following operations:

determine the duty cycle limit for a first time period (e.g., 1 s);
predict the duty cycle for the first time period by the end of an upcoming periodic signaling transmission; and
skip the signaling transmission, if the predicted duty cycle exceeds the determined duty cycle limit.

According to yet other embodiments, the transmitter may perform the following operations:

determine the duty cycle limit for a first period of time (e.g., 1 s);
predict the duty for the first time period by the end of an scheduled data transmission;
delay the data transmission for a second period of time, and repeat the previous operation in this embodiment, if the predicted duty cycle exceeds the determined duty cycle limit, where
the second period of time is much less than the first period of time, e.g., 1 ms in this example; and
perform data transmission if the predicted duty cycle does not exceed the determined duty cycle limit.

According to still further embodiments, the transmitting device may perform the following operations:

determine the $T_{off}$ limit according to regulations for access to radio resources
the value of $T_{off}$ limit can be determined based on the measured channel occupancy level of the radio channel,
the method of determining the $T_{off}$ limit based on the channel occupancy level is specified in the regulatory requirement document for specific ITS frequency band (e.g., in draft ETSI EN 302 571 V2.0.0 (2016-March) [Reference 1]);
evaluate the time interval occurring between two or more consecutive scheduled transmissions by the UE, where at least one of such transmissions has not occurred yet;
determine a priority level for each of the two or more consecutive scheduled transmissions by the UE; and If the evaluated time interval violates the $T_{off}$ limit set by the regulations, drop at least one of the scheduled transmissions starting from those with lower priority, until the $T_{off}$ limit set by the regulations is fulfilled for the remaining transmissions.

The priority levels may be autonomously determined by the UE or according to a standard. For example, PSSCH and PSCCH transmissions may have higher priority than SLSS or PSBCH transmissions. For example, a first transmission of a transport block over PSSCH may have higher priority than a second transmission of the same transport block over PSSCH.

According to yet further embodiments, certain signals or channels may be dropped or down-prioritized by the UE only within a certain limit. For example, the UE may not be allowed to drop more than a certain fraction of SLSS/PSBCH transmissions in favor of PSCCH/PSSCH transmissions due to regulatory constraints. Once the maximum limit of SLSS/PSBCH drops is reached, the UE shall prioritize SLSS/PSBCH transmissions over PSSCH/PSCCH.

Figure 4:
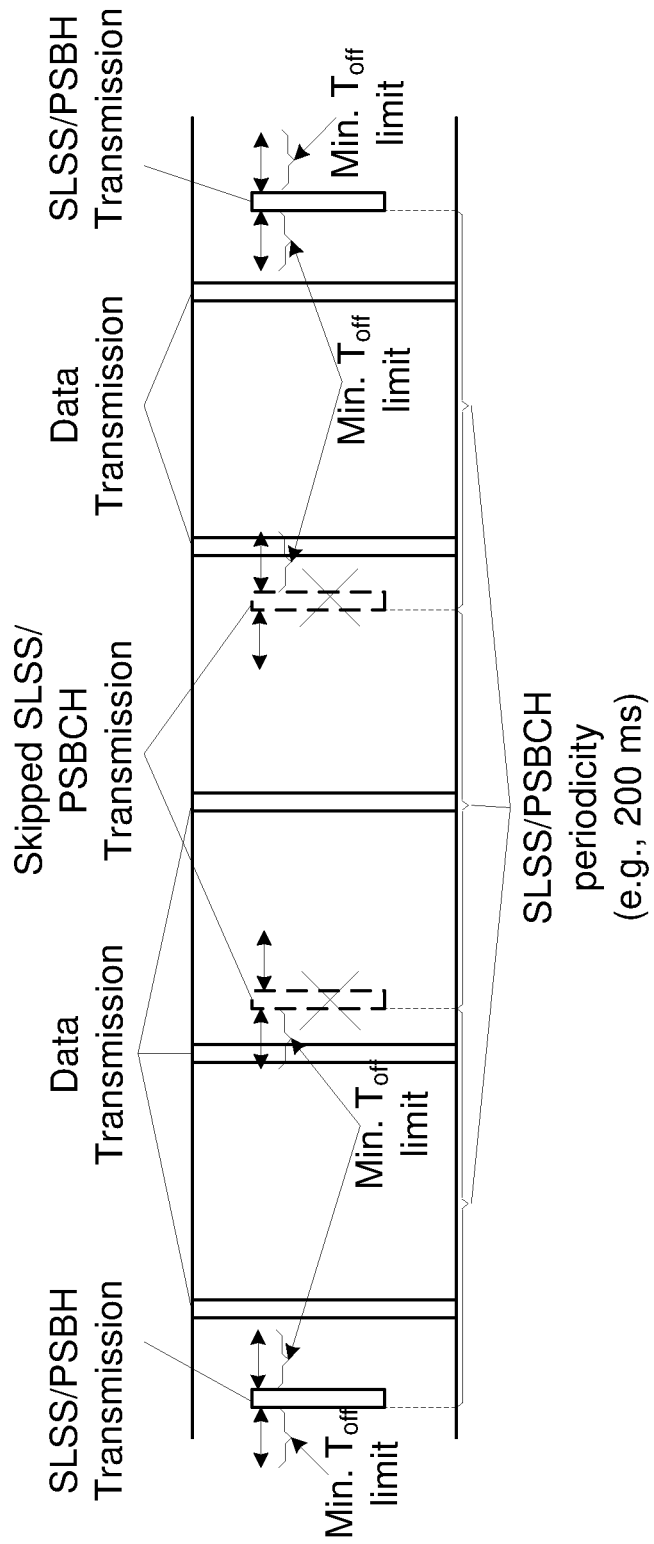
FIG. 4 is a timing diagram illustrating cancellation of two signaling (SLSS/PSBCH) transmissions due to the minimum $T_{off}$ limit.

FIG. 4 is a timing diagram illustrating cancellation of two signaling (SLSS/PSBCH) transmissions due to the minimum $T_{off}$ limit According to some embodiments of inventive concepts, methods may prioritize one type of transmission (data transmission) over another type of transmission (signaling transmission) under the restrictions of regulatory limits (e.g., $T_{off}$ and duty cycle limits). According to some embodiments of inventive concepts, methods may determine violation of $T_{off}$ and/or duty cycle limits, determine relative priorities among different types of transmissions, and down-prioritize certain transmissions by skipping or dropping a transmission if any potential violation with $T_{off}$ and/or duty cycle limits is detected. Moreover, "look-ahead behavior" of the transmitter may be used when determining potential violations and relative priorities among ongoing transmissions.

Operations of a wireless communication device UE according to some embodiments will now be discussed with reference to the flow chart of FIGS. 6 and 7. For example, modules may be stored in wireless terminal memory 505 of FIG. 5, and these modules may provide instructions so that when the instructions of a module are executed by UE processor 503, processor 503 performs respective operations of the flow chart of FIG. 6 or FIG. 7.

As shown in FIG. 5, processor 503 of wireless communication device UE may communicate through transceiver 501 over a radio interface directly with another wireless communication device without using a Radio Access Network (referred to as sidelink communications), or processor 503 may communicate through transceiver 501 over a radio interface with the Radio Access Network (referred to as network communications).

Figure 6:
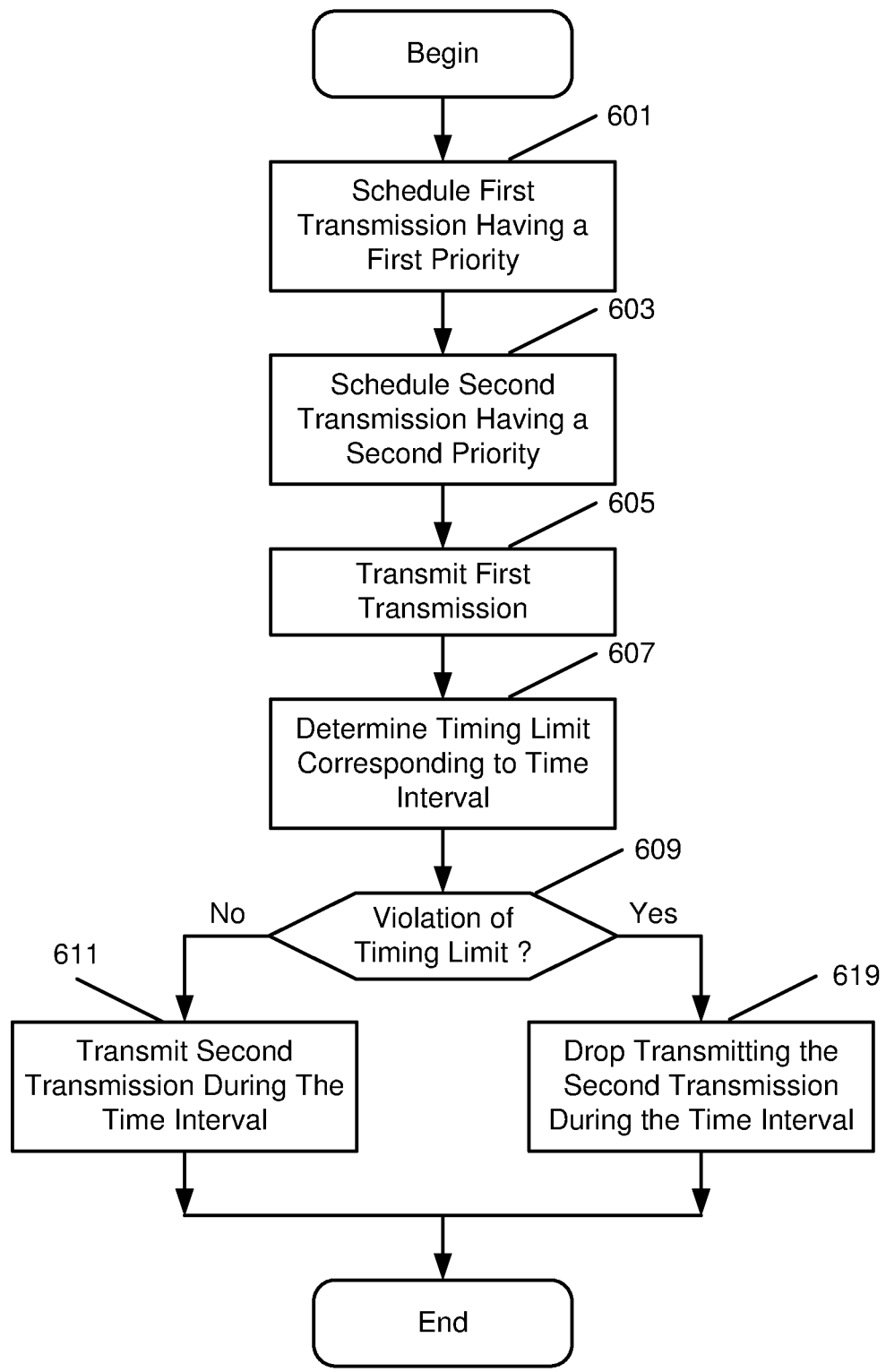
FIGS. 6 and 7 are flow charts illustrating operations of wireless communication devices according to some embodiments of inventive concepts.

FIG. 6 illustrates some embodiments of operating a V2X wireless communication device UE in communication with one or more other V2X wireless communication devices supporting V2X sidelink communications according to some embodiments of inventive concepts. Moreover, the V2X wireless communication device UE may be integrated in a vehicle.

At block 601, processor 503 may schedule a first transmission (e.g., a first sidelink V2X transmission) from wireless communication device UE (e.g., using a first scheduling module), and at block 603, processor 503 may schedule a second transmission (e.g., a second sidelink V2X transmission) from the wireless communication device (e.g., using a second scheduling module). Moreover, the first transmission has a first priority, the second transmission has a second priority, the first priority is greater than the second priority, and the first and second transmissions are scheduled during a time interval.

At block 605, processor 503 may transmit the first transmission during the time interval through transceiver 501 over a wireless (e.g., radio) interface (e.g., using a first transmission module).

At block 607, processor 503 may determine a timing limit corresponding to scheduling the first and second transmissions during the time interval (e.g., using a timing limit determining module).

Responsive to determining a violation of the timing limit corresponding to scheduling the first and second transmissions during the time interval at block 609 (e.g., using a violation determining module) and responsive to the first priority being greater than the second priority, processor 503 may drop the transmission of (also referred to as block transmitting) the second transmission during the time interval at block 619 (e.g., using a dropping or a transmission dropping or blocking module). In the alternative, processor 503 may transmit the second transmission through transceiver 501 over the wireless (e.g., radio) interface during the time interval at block 611 (e.g., using a second transmission module) responsive to determining compliance with the timing limit corresponding to scheduling the first and second transmission during the time interval at block 609 (e.g., using the violation determining module).

According to some embodiments, the first transmission may be a data transmission, and the second transmission may be a signaling transmission, with data transmissions inherently having higher priority than signaling transmissions. For example, the signaling transmission may include a synchronization signal signaling transmission (such as a Sidelink Synchronization Signal SLSS signaling transmission) or a broadcast channel signaling transmission (such as a Physical Sidelink Broadcast Channel PSBCH signaling transmission). The data transmission may include at least one of a Co-operative Awareness Message CAM, a Decentralized Environmental Notification Message DENM, a Basic Safety Message BSM, and/or a Dedicated Short Range Communications DSRC Message.

More particularly, the second data transmission may be a periodic signaling transmission that is scheduled for periodic transmission according to a defined period (e.g., every 200 milliseconds or ms). Accordingly, blocking transmitting the periodic signaling transmission during the time interval may include skipping one instance of periodic transmission of the periodic signaling transmission. Because the periodic signaling transmission is repeated according to the defined period (e.g., every 200 ms), a missed transmission may not significantly impact system performance. In contrast, the data transmission may be event-triggered.

According to some other embodiments, the first and second transmission may both be data transmissions of different types having different priorities. In such embodiments, both data transmissions may be event triggered. For example, the first data transmission having higher priority may include safety information, and the second data transmission having lower priority may include non-safety information. In alternatives: the first data transmission having higher priority may have more restrictive latency requirements, and the second data transmission having lower priority may have less restrictive latency requirements; the first data transmission having higher priority may have more restrictive reliability requirements, and the second data transmission having lower priority may have less restrictive reliability requirements; and/or the first data transmission having higher priority may have more restrictive capacity requirements, and the second data transmission having lower priority may have less restrictive capacity requirements.

Determining the timing limit may include determining the timing limit based on a time off ($T_{off}$) value defining a minimum time between two consecutive transmissions from the wireless communication device, and/or based on a duty cycle value defining a fraction of a period of time that the wireless communication device is allowed to transmit. If using both time off and duty cycle values, for example, a violation may occur at block 609 if either of the time off value or the duty cycle value is violated. A time off violation may occur, for example, if a time between scheduled transmissions of the first and second transmissions is less than the time off value. A duty cycle violation may occur if a predicted cumulative time of transmission (including transmission of the first and second transmissions) over a duty cycle period (e.g., 1 second) exceeds the duty cycle value. Moreover, determining the timing limit may include determining the timing limit based on a measurement of a channel occupancy level (such as a Channel Busy Ratio CBR). Accordingly, determining the timing limit may be based on a current usage of a radio channel used by the wireless communication device UE for transmission.

According to some embodiments of FIG. 6, the first transmission may be scheduled to precede the second transmission. With such scheduling, processor 503 may transmit the first transmission after scheduling the second transmission at block 603 and before determining the timing limit at block 607, or processor 503 may transmit the first transmission before scheduling the second transmission (e.g., so that block 605 precedes block 603), or processor 503 may transmit the first transmission after determining the timing limit at block 607 (e.g., so that block 605 follows block 607.

According to some other embodiments of FIG. 6, the second transmission may be scheduled to precede the first transmission. With such scheduling, processor 503 may transmit the first transmission after determining the timing limit at block 607 and after determining whether a violation has occurred at block 609.

Various operations of FIG. 6 and/or related modules may be optional with respect to some embodiments of wireless communication devices and related methods. Regarding methods of example embodiment 1 (set forth below), for example, operations of blocks 609 and 611 of FIG. 6 (and related modules) may be optional.

Figure 7:
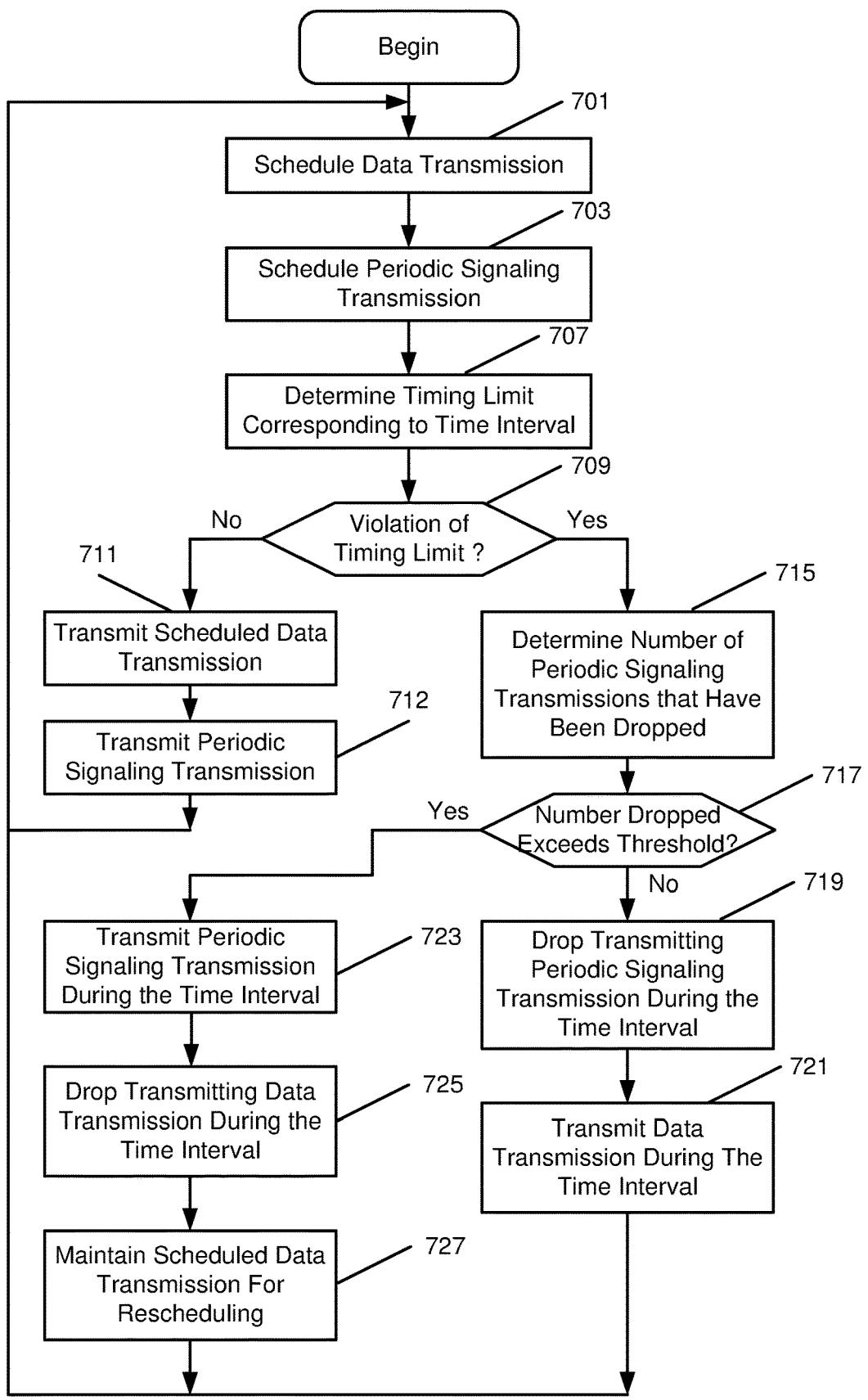

FIG. 7 illustrates some embodiments of operating a V2X wireless communication device UE in communication with one or more other V2X wireless communication devices supporting V2X sidelink communications according to some other embodiments of inventive concepts. Moreover, the V2X wireless communication device UE may be integrated in a vehicle.

At block 701, processor 503 may schedule a first data transmission from the wireless communication device (e.g., using a data scheduling module), and at block 703, processor 503 may schedule a first periodic signaling transmission from the wireless communication device (e.g., using a periodic signaling scheduling module). Moreover, the first data transmission and the first periodic signaling transmission may be scheduled during a first time interval.

At block 707, processor 503 may determine a timing limit corresponding to scheduling the first data transmission and the first signaling transmission during the first time interval (e.g., using a timing limit determining module).

Responsive to determining a violation of the timing limit corresponding to scheduling the first data transmission and the first signaling transmission during the first time interval at block 709 (e.g., using a violation determining module) processor 503 may determine at block 715 a number/fraction of previous periodic signaling transmissions that have been dropped, also referred to as skipped (e.g., using a dropped determining module, also referred to as a skipped determining module). Responsive to determining the violation at block 709 and responsive to determining that the number of dropped (or skipped) transmissions does not exceed a threshold at block 717 (e.g., using a threshold module), processor 503 may drop transmitting (also referred to as block transmitting) the first signaling transmission during the first time interval at block 719 (e.g., using signaling dropping module), and processor 503 may transmit the first data transmission during the first time interval at block 721 (e.g., using data transmission module). The threshold, for example, may be defined as a number of consecutive periodic signaling transmissions that have been dropped (or skipped) prior to the first time interval, and/or the threshold may be defined as a fraction of a number of consecutive periodic signaling transmissions prior to the first time interval that have been dropped (or skipped).

At a later time, processor 503 may schedule a second data transmission from the wireless communication device at block 701 (e.g., using the data scheduling module), and processor 503 may schedule a second periodic signaling transmission from the wireless communication device at block 703 (e.g., using the periodic signaling scheduling module). Moreover, the second data transmission and the second periodic signaling transmission may be scheduled during a second time interval.

At block 707, processor 503 may determine a timing limit corresponding to scheduling the second data transmission and the second signaling transmission during the second time interval (e.g., using the timing limit determining module).

Responsive to determining a violation of the timing limit corresponding to scheduling the second data transmission and the second signaling transmission during the second time interval at block 709 (e.g., using the violation determining module), processor 503 may determine at block 715 a number/fraction of previous periodic signaling transmissions that have been dropped (or skipped) (e.g., using the dropped determining module, also referred to as the skipped determining module). Responsive to determining the violation at block 709 and responsive to determining that the number of dropped (or skipped) transmissions does exceed the threshold at block 717 (e.g., using the threshold module), processor 503 may transmit the second signaling transmission during the second time interval at block 723 (e.g., using a signaling transmission module), and processor 503 may drop transmitting (also referred to as block transmitting) the second data transmission during the second time interval at block 725 (e.g., using data dropping module). As discussed above, the threshold, may be defined as a number of consecutive periodic signaling transmissions that have been dropped (or skipped) prior to the first time interval, and/or the threshold may be defined as a fraction of a number of consecutive periodic signaling transmissions prior to the first time interval that have been dropped (or skipped). The first periodic signaling transmission that was dropped at block 719, for example, may be one of the previously dropped (or skipped) periodic signaling transmissions that contributes to the decision at block 717 to transmit the second periodic signaling transmission and to block the second data transmission. At block 727, processor 503 may maintain the second data transmission for rescheduling (e.g., using a data maintenance module).

At a still later time, processor 503 may schedule/reschedule the second data transmission from the wireless communication device (e.g., using the data scheduling module), and at block 703, processor 503 may schedule a third periodic signaling transmission from the wireless communication device (e.g., using the periodic signaling scheduling module). Moreover, the second data transmission and the third periodic signaling transmission may be scheduled during a third time interval.

At block 707, processor 503 may determine a timing limit corresponding to scheduling the second data transmission and the third signaling transmission during the third time interval (e.g., using the timing limit determining module).

Responsive to determining that there is no violation of the timing limit corresponding to scheduling the second data transmission and the third signaling transmission during the third time interval at block 709 (e.g., using the violation determining module) processor 503 may transmit the second data transmission during the third time interval at block 711 (e.g., using the data transmission module), and processor 503 may transmit the third signaling transmission during the third time interval at block 712 (e.g., using the signaling transmission module).

The periodic signaling transmissions of FIG. 7 may include synchronization signal signaling transmissions (such as Sidelink Synchronization Signal SLSS signaling transmissions), and/or broadcast channel signaling transmissions such as Physical Sidelink Broadcast Channel PSBCH signaling transmissions).

Each of the data transmissions of FIG. 7 may include at least one of a Co-operative Awareness Message CAM, a Decentralized Environmental Notification Message DENM, a Basic Safety Message BSM, and/or a Dedicated Short Range Communications DSRC Message.

Moreover, the periodic signaling transmissions of FIG. 7 may be scheduled for periodic transmission according to a defined period (e.g., 200 ms), and dropping transmitting a periodic signaling transmission at block 719 may include dropping (or skipping) one instance of periodic transmission of the periodic signaling transmission.

Operations of blocks 707 and 709 may be the same as and/or similar to operations discussed above with respect to blocks 607 and 609. The timing limit/limits, for example, may be based on a time off ($T_{off}$) value defining a minimum time between two consecutive transmissions from the wireless communication device, and/or based on a duty cycle value defining a fraction of a period of time that the wireless communication device is allowed to transmit. The first data transmission and the first periodic signaling transmission discussed above with respect to FIG. 7, for example, may be determined to violate the timing limit at block 709 because there is insufficient time between the two transmissions violating $T_{off}$, and/or because the two transmissions (together with possibly other transmissions) are predicted to violate a duty cycle value. Moreover, the timing limit (e.g., the time off value and/or the duty cycle value) may be determined based on a measurement of a channel occupancy level (e.g., a Channel Busy Ratio CBR) that is determined at the wireless communication device.

Various operations of FIG. 7 and/or related modules may be optional with respect to some embodiments of wireless communication devices and related methods. Regarding methods of example embodiment 1 (set forth below), for example, operations of blocks 709, 711, 712, 715, 717, 723, 725, and 727 of FIG. 7 (and related modules) may be optional.

EXAMPLE EMBODIMENTS

1. A method of operating a wireless communication device (UE) providing sidelink communications with other wireless devices, the method comprising: scheduling (601, 701) a first transmission from the wireless communication device, wherein the first transmission has a first priority; scheduling (603, 703) a second transmission from the wireless communication device, wherein the second transmission has a second priority, wherein the first priority is greater than the second priority, and wherein the first and second transmissions are scheduled during a time interval; transmitting (605, 721) the first transmission during the time interval; determining (607, 707) a timing limit corresponding to scheduling the first and second transmissions during the time interval; and responsive to determining a violation of the timing limit corresponding to scheduling the first and second transmissions during the time interval and responsive to the first priority being greater than the second priority, blocking (619, 719) transmitting the second transmission during the time interval.

2. The method of Embodiment 1, wherein the first transmission is a data transmission and the second transmission is a signaling transmission.

3. The method of Embodiment 2 wherein the signaling transmission comprises a synchronization signal signaling transmission.

4. The method of Embodiment 3 wherein the synchronization signal signaling transmission comprises a Sidelink Synchronization Signal, SLSS, signaling transmission.

5. The method of any of Embodiments 2-4 wherein the signaling transmission comprises a broadcast channel signaling transmission.

6. The method of Embodiment 5 wherein the broadcast channel signaling transmission comprises a Physical Sidelink Broadcast Channel, PSBCH, signaling transmission.

7. The method of any of Embodiments 2-6 wherein the data transmission comprises at least one of a Co-operative Awareness Message, CAM, a Decentralized Environmental Notification Message, DENM, a Basic Safety Message, BSM, and/or a Dedicated Short Range Communications, DSRC, Message.

8. The method of any of Embodiments 2-7, wherein the signaling transmission is a periodic signaling transmission that is scheduled for periodic transmission according to a defined period.

9. The method of Embodiment 8 wherein blocking transmitting the second transmission during the time interval comprises skipping one instance of periodic transmission of the periodic signaling transmission.

10. The method of any of Embodiments 8-9 wherein the defined period is 200 ms.

11. The method of any of Embodiments 9-10, wherein the time interval is a first time interval, the method further comprising: responsive blocking transmitting the periodic signaling transmission during the first time interval, scheduling (703) the periodic signaling transmission for transmission during a second time interval after the first time interval according to the defined period.

12. The method of Embodiment 11, further comprising: determining (707) a timing limit corresponding to scheduling the periodic signaling transmission during the second time interval; and responsive to determining compliance with the timing limit corresponding to scheduling the periodic signaling transmission during the second time interval, transmitting (712) the periodic signaling transmission during the second time interval.

13. The method of Embodiment 11, wherein the data transmission is a first data transmission, the method further comprising: scheduling (701) a second data transmission from the wireless communication device, wherein the second data transmission has the first priority, wherein the second data transmission is scheduled during the second time interval; determining (707) a timing limit corresponding to scheduling the periodic signaling transmission and the second data transmission during the second time interval; responsive to determining a violation of the timing limit corresponding to scheduling the periodic signaling transmission and the second data transmission during the second time interval, determining (715) a number of previously scheduled transmissions of the periodic signaling transmission that have been skipped; responsive to the number of previously scheduled transmission of the periodic signaling transmission that have been skipped exceeding a threshold, transmitting (723) the periodic signaling transmission during the second time interval; and responsive to the number of previously scheduled transmission of the periodic signaling transmission that have been skipped exceeding the threshold, blocking transmitting (725) the second data transmission during the second time interval.

14. The method of Embodiment 13 further comprising: responsive to the number of previously scheduled transmission of the periodic signaling transmission that have been skipped exceeding the threshold, rescheduling (701) the second data transmission for transmission after the second time interval; determining (707) a timing limit corresponding to rescheduling the second data transmission after the second time interval; and responsive to determining compliance with the timing limit corresponding to scheduling the second data transmission after the second time interval, transmitting (711) the second data transmission after the second time interval.

15. The method of any of Embodiments 1-14 wherein determining the timing limit comprises determining the timing limit based on a time off ($T_{off}$) value defining a minimum time between two consecutive transmissions from the wireless communication device.

16. The method of any of Embodiments 1-15 wherein determining the timing limit comprises determining the timing limit based on a duty cycle value defining a fraction of a period of time that the wireless communication device is allowed to transmit.

17. The method of any of Embodiments 1-16, wherein determining the timing limit comprises determining the timing limit based on a measurement of a channel occupancy level.

18. The method of Embodiment 17 wherein the measurement of the channel occupancy level comprises a Channel Busy Ratio, CBR.

19. The method of any of Embodiments 1-18, wherein the wireless communication device (UE) is a V2X wireless communication device that is integrated in a vehicle, wherein the first transmission is a first sidelink V2X transmission, wherein the second transmission is a second sidelink V2X transmission.

20. The method of any of Embodiments 1-19 wherein the first transmission is scheduled to precede the second transmission.

21. The method of any of Embodiments 1-20 wherein transmitting the first transmission precedes scheduling the second transmission.

22. The method of any of Embodiments 1-20 wherein transmitting the first transmission follows scheduling the second transmission and precedes determining the timing limit.

23. The method of any of Embodiments 1-19 wherein the second transmission is scheduled to precede the first transmission.

24. The method of any of Embodiments 1-19 and 23 wherein transmitting the first transmission follows determining the timing limit.

25. A method of operating a wireless communication device (UE) providing sidelink communications with other wireless devices, the method comprising: scheduling (701) a data transmission from the wireless communication device; scheduling (703) a signaling transmission from the wireless communication device, wherein the first and second transmissions are scheduled during a time interval; responsive to determining a violation of a timing limit corresponding to scheduling the data and signaling transmissions during the time interval, blocking (719) transmitting the signaling transmission during the time interval; and transmitting (721) the data transmission during the time interval.

26. The method of Embodiment 25, wherein the signaling transmission is a periodic signaling transmission that is scheduled for periodic transmission according to a defined period.

27. The method of Embodiment 26 wherein blocking transmitting the periodic signaling transmission during the time interval comprises skipping one instance of periodic transmission of the periodic signaling transmission.

28. The method of any of Embodiments 26-27 wherein the defined period is 200 ms.

29. The method of any of Embodiments 25-28 wherein the signaling transmission comprises a synchronization signal signaling transmission.

30. The method of Embodiment 29 wherein the synchronization signal signaling transmission comprises a Sidelink Synchronization Signal, SLSS, signaling transmission.

31. The method of any of Embodiments 25-30 wherein signaling transmission comprises a broadcast channel signaling transmission.

32. The method of Embodiment 31 wherein the broadcast channel signaling transmission comprises a Physical Sidelink Broadcast Channel, PSBCH, signaling transmission.

33. The method of any of Embodiments 25-32 wherein the data transmission comprises at least one of a Cooperative Awareness Message, CAM, a Decentralized Environmental Notification Message, DENM, a Basic Safety Message, BSM, and/or a Dedicated Short Range Communications, DSRC, Message.

34. The method of any of Embodiments 26-33, wherein the time interval is a first time interval, the method further comprising: responsive blocking transmitting the periodic signaling transmission during the first time interval, scheduling (703) the periodic signaling transmission for transmission during a second time interval after the first time interval according to the defined period.

35. The method of Embodiment 34, further comprising: responsive to determining compliance with a timing limit corresponding to scheduling the periodic signaling transmission during the second time interval, transmitting (712) the periodic signaling transmission during the second time interval.

36. The method of Embodiment 34, wherein the data transmission is a first data transmission, the method further comprising: scheduling (701) a second data transmission from the wireless communication device, wherein the second data transmission is scheduled during the second time interval; responsive to determining a violation of a timing limit corresponding to scheduling the periodic signaling transmission and the second data transmission during the second time interval, determining (715) a number of previously scheduled transmissions of the periodic signaling transmission that have been skipped; responsive to the number of previously scheduled transmissions of the periodic signaling transmission that have been skipped exceeding a threshold, transmitting (723) the periodic signaling transmission during the second time interval; and responsive to the number of previously scheduled transmissions of the periodic signaling transmission that have been skipped exceeding the threshold, blocking transmitting (725) the second data transmission during the second time interval.

37. The method of Embodiment 36 further comprising: responsive to the number of previously scheduled transmissions of the periodic signaling transmission that have been skipped exceeding the threshold, rescheduling (701) the second data transmission for transmission after the second time interval; and responsive to determining compliance with a timing limit corresponding to scheduling the second data transmission after the second time interval, transmitting (711) the second data transmission after the second time interval.

38. The method of any of Embodiments 25-37, further comprising: before blocking transmitting the signaling transmission, determining (707) the timing limit corresponding to scheduling the data and signaling transmissions during the time interval.

39. The method of any of Embodiment 38 wherein determining the timing limit comprises determining the timing limit based on a time off ($T_{off}$) value defining a minimum time between two consecutive transmissions from the wireless communication device.

40. The method of any of Embodiments 38-39 wherein determining the timing limit comprises determining the timing limit based on a duty cycle value defining a fraction of a period of time that the wireless communication device is allowed to transmit.

41. The method of any of Embodiments 38-40, wherein determining the timing limit comprises determining the timing limit based on a measurement of a channel occupancy level.

42. The method of Embodiment 41 wherein the measurement of the channel occupancy level comprises a Channel Busy Ratio, CBR.

43. The method of any of Embodiments 25-42, wherein the wireless communication device (UE) is a V2X wireless communication device that is integrated in a vehicle, wherein the data transmission is a sidelink V2X data transmission, and wherein the signaling transmission is a sidelink V2X signaling transmission.

44. The method of any of Embodiments 25-43 wherein the data transmission is scheduled to precede the signaling transmission.

45. The method of any of Embodiments 25-43 wherein the signaling transmission is scheduled to precede the data transmission.

46. The method of any of Embodiments 25-45 wherein transmitting the data transmission follows scheduling the signaling transmission.

47. The method of any of Embodiments 25-46 wherein the data transmission has a first priority, wherein the signaling transmission has a second priority, and wherein the first priority is higher than the second priority.

48. A method of operating a wireless communication device (UE) providing sidelink communications with other wireless devices, the method comprising: scheduling (601, 701) a first transmission from the wireless communication device, wherein the first transmission has a first priority; scheduling (603, 703) a second transmission from the wireless communication device, wherein the second transmission has a second priority, wherein the first priority is greater than the second priority, and wherein the first and second transmissions are scheduled during a time interval; transmitting (605, 721) the first transmission during the time interval; and responsive to determining a violation of a timing limit corresponding to scheduling the first and second transmissions during the time interval and responsive to the first priority being greater than the second priority, blocking (619, 719) transmitting the second transmission during the time interval.

49. The method of Embodiment 48, wherein the first transmission is a data transmission and the second transmission is a signaling transmission.

50. The method of Embodiment 49 wherein the signaling transmission comprises a synchronization signal signaling transmission.

51. The method of Embodiment 50 wherein the synchronization signal signaling transmission comprises a Sidelink Synchronization Signal, SLSS, signaling transmission.

52. The method of any of Embodiments 49-51 wherein the signaling transmission comprises a broadcast channel signaling transmission.

53. The method of Embodiment 52 wherein the broadcast channel signaling transmission comprises a Physical Sidelink Broadcast Channel, PSBCH, signaling transmission.

54. The method of any of Embodiments 49-53 wherein the data transmission comprises at least one of a Cooperative Awareness Message, CAM, a Decentralized Environmental Notification Message, DENM, a Basic Safety Message, BSM, and/or a Dedicated Short Range Communications, DSRC, Message.

55. The method of any of Embodiments 49-54, wherein the signaling transmission is a periodic signaling transmission that is scheduled for periodic transmission according to a defined period.

56. The method of Embodiment 55 wherein blocking transmitting the second transmission during the time interval comprises skipping one instance of periodic transmission of the periodic signaling transmission.

57. The method of any of Embodiments 55-56 wherein the defined period is 200 ms.

58. The method of any of Embodiments 56-57, wherein the time interval is a first time interval, the method further comprising: responsive blocking transmitting the periodic signaling transmission during the first time interval, scheduling (703) the periodic signaling transmission for transmission during a second time interval after the first time interval according to the defined period.

59. The method of Embodiment 58, further comprising: responsive to determining compliance with a timing limit corresponding to scheduling the periodic signaling transmission during the second time interval, transmitting (712) the periodic signaling transmission during the second time interval.

60. The method of Embodiment 58, wherein the data transmission is a first data transmission, the method further comprising: scheduling (701) a second data transmission from the wireless communication device, wherein the second data transmission has the first priority, wherein the second data transmission is scheduled during the second time interval; responsive to determining a violation of a timing limit corresponding to scheduling the periodic signaling transmission and the second data transmission during the second time interval, determining (715) a number of previously scheduled transmissions of the periodic signaling transmission that have been skipped; responsive to the number of previously scheduled transmission of the periodic signaling transmission that have been skipped exceeding a threshold, transmitting (723) the periodic signaling transmission during the second time interval; and responsive to the number of previously scheduled transmission of the periodic signaling transmission that have been skipped exceeding the threshold, blocking transmitting (725) the second data transmission during the second time interval.

61. The method of Embodiment 60 further comprising: responsive to the number of previously scheduled transmission of the periodic signaling transmission that have been skipped exceeding the threshold, rescheduling (701) the second data transmission for transmission after the second time interval; and responsive to determining compliance with a timing limit corresponding to scheduling the second data transmission after the second time interval, transmitting (711) the second data transmission after the second time interval.

62. The method of any of Embodiments 48-61 further comprising: before blocking transmitting the second transmission, determining (607, 707) the timing limit corresponding to scheduling the first and second transmissions during the time interval.

63. The method of Embodiment 62 wherein determining the timing limit comprises determining the timing limit based on a time off ($T_{off}$) value defining a minimum time between two consecutive transmissions from the wireless communication device.

64. The method of any of Embodiments 62-63 wherein determining the timing limit comprises determining the timing limit based on a duty cycle value defining a fraction of a period of time that the wireless communication device is allowed to transmit.

65. The method of any of Embodiments 62-64, wherein determining the timing limit comprises determining the timing limit based on a measurement of a channel occupancy level.

66. The method of Embodiment 65 wherein the measurement of the channel occupancy level comprises a Channel Busy Ratio, CBR.

67. The method of any of Embodiments 48-66, wherein the wireless communication device (UE) is a V2X wireless communication device that is integrated in a vehicle, wherein the first transmission is a first sidelink V2X transmission, wherein the second transmission is a second sidelink V2X transmission.

68. The method of any of Embodiments 48-67 wherein the first transmission is scheduled to precede the second transmission.

69. The method of any of Embodiments 48-68 wherein transmitting the first transmission precedes scheduling the second transmission.

70. The method of any of Embodiments 48-69 wherein transmitting the first transmission follows scheduling the second transmission and precedes determining the timing limit.

71. The method of any of Embodiments 48-68 wherein the second transmission is scheduled to precede the first transmission.

72. The method of any of Embodiments 48-67 and 71 wherein transmitting the first transmission follows determining the timing limit.

73. A wireless communication device (UE) comprising: a transceiver (501) configured to provide wireless communication over a radio interface; and a processor (503) coupled to the transceiver, wherein the processor is configured to perform operations according to any of Embodiments 1-72.

74. A wireless communication device (UE) adapted to perform according to any of Embodiments 1-72.

75. A wireless communication device (UE) comprising modules adapted to perform according to any of Embodiments 1-72.

Explanations of various abbreviations used in the present disclosure are provided below.

| Abbreviation | Explanation |
| --- | --- |
| CAM | Co-operative Awareness Message |
| CBR | Channel Busy Ratio |
| DENM | Decentralized Environmental Notification Message |
| DSRC | Dedicated Short Range Communications |
| ETSI | European Telecommunications Standards Institute |
| ITS | Intelligent Transport Systems |
| MIB-SL | Master Information Block for Sidelink |
| PSBCH | Physical Sidelink Broadcast Channel |
| PSCCH | Physical Sidelink Control Channel |
| PSSCH | Physical Sidelink Shared Channel |
| SA | Scheduling Assignment |
| SLSS | Sidelink Synchronization Signals |
| V2V | Vehicle to Vehicle |
| V2X | Vehicle to everything |

Some further embodiments of inventive concepts are discussed below.

Congestion control may reduce/prevent the radio channel from being congested by too many transmissions within a certain geographical area. This may be achieved by placing limits on several transmitter parameters based on channel occupancy level at the moment. For example, draft ETSI EN 302 571 V2.0.0 (2016-March) [Reference 1] [Reference 2] for the 5.9 GHz ITS band in Europe specifies regulatory limits on maximum $T_{on}$, minimum $T_{off}$ and maximum Duty Cycle of UE transmitters based on the channel occupancy level measured as Channel Busy Ratio (CBR), where $T_{on}$ is the current duration of a transmission, $T_{off}$ is the current allowed minimum time between two consecutive transmissions, Duty Cycle is the ratio expressed as a percentage of the maximum transmitter "on" time on one carrier frequency, relative to 1 second. [Reference 2]

In this document, the impact of minimum $T_{off}$ limit and maximum duty cycle limit on UE transmitter behavior is discussed and solutions from RAN1 perspective are developed for fulfilling the corresponding requirements. A companion contribution [Reference 4] focuses on the impact of $T_{on}$.

Impact from regulatory $T_{off}$ and duty cycle requirements on UE transmitter behavior According to [Reference 2], (see also Appendix A) the minimum $T_{off}$ limit is 25 ms or higher and can be up to 1 s (second), e.g. when CBR>62%.

Observations:

According to draft ETSI EN 302 571 V2.0.0 (2016-March) [Reference 1] [Reference 2], the minimum $T_{off}$ limit is 25 ms or higher and can be up to 1 second depending on the current channel occupancy level.

As a radio layer requirement, the $T_{off}$ limit is applicable to all transmissions of a UE operating in the ITS band. These include SA/Data and signaling transmissions, e.g. SLSS/PSBCH. The time interval between consecutive messages arriving from higher layers at the PDCP layer of a UE can be controlled by the higher layer congestion control function, as outlined in [Reference 3]. However, in order to comply with the radio layer $T_{off}$ requirement, which does not differentiate the type of transmissions, UE has also to coordinate transmissions of SA/Data and some signaling (SLSS/PSBCH) from RAN1 perspective.

Proposals:

In order to comply with the radio layer $T_{off}$ requirement, which does not differentiate the type of transmissions, UE has to coordinate transmissions of SA/Data and some signaling (SLSS/PSBCH) from RAN1 perspective.

SA and Data Transmission

Agreements in 3GPP RAN1 #85:

[ . . . ]

For a SA and associated data resource pool it should be (pre)configured whether the SA and associated data transmission by all the UEs using this pool either occur on the same subframe in an adjacent manner, or occur on different subframes, (FFS or occur on the same subframe in a potentially non-adjacent manner).

If the FFS part is not supported, this reverts the existing agreement "When SA and the associated data are transmitted in the same TTI, they can be transmitted in non-adjacent RBs."

Strive for not increasing the number of SA blind decoding to enable this.

Given the large $T_{off}$ limit value, typically larger than 25 ms, it is preferred to transmit SA and its associated data in the same subframe and multiplex them in the frequency domain so that any time gap between SA and its associated data is avoided.

Proposals:

In order to comply with the regulatory $T_{off}$ requirement, which is typically larger than 25 ms, the SA and its associated data shall be FDMed in the same subframe.

SLSS/PSBCH Transmission:

Agreements in 3GPP RAN1 #85:

[ . . . ]

Working assumption: V2V SLSS/PSBCH periodicity is 200 ms.

If it is agreed that SLSS/PSBCH is used for the purpose of detecting LTE ITS transmissions, this working assumption needs to be revisited.

[ . . . ]

According to the agreements in RAN1 #85, the V2V SLSS/PSBCH transmission has a periodicity of 200 ms (please note that Ericsson proposes a revision to 256 ms periodicity [Reference 5]). If the time between a data transmission and a SLSS/SPBCH transmission is too close, it may violate the minimum $T_{off}$ limit. Due to the repetitiveness of the signaling transmissions, a transmitter UE may at times consider SLSS/PSBCH as of less importance than a data transmission. Hence, the UE shall be able to prioritize the data transmission over SLSS/PSBCH transmissions, in order to meet the $T_{off}$ and duty cycle limits. Particularly, the following cases are considered:

1. If an upcoming SLSS/PSBCH transmission is going to occur within the $T_{off}$ limit its data transmission, the UE shall skip the SLSS/PSBCH transmission.

2. If a data transmission is scheduled within the $T_{off}$ limit before an upcoming SLSS/PSBCH transmission, the UE shall skip the SLSS/PSBCH transmission.
3. Before each SLSS/PSBCH transmission, the UE shall evaluate the duty cycle in the past 1 second taking into account the upcoming SLSS/PSBCH transmission. If the evaluation result exceeds the maximum duty cycle limit, the UE shall skip the SLSS/PSBCH transmission.

FIG. 4 shows the cancellation of SLSS/PSBCH transmission due to the minimum $T_{off}$ limit, and prioritized data transmissions over SLSS/PSBCH transmissions within $T_{off}$ limit Proposals:
  The specifications should allow the UE to prioritize data transmissions over SLSS/PSBCH transmissions in order to meet the $T_{off}$ and duty cycle limits. More specifically,
    if an upcoming SLSS/PSBCH transmission is going to occur within the $T_{off}$ limit before a scheduled or reserved data transmission, the UE shall skip the SLSS/PSBCH transmission.
    if a data transmission is scheduled or performed within the $T_{off}$ limit before an upcoming SLSS/PSBCH transmission, the UE shall skip the SLSS/PSBCH transmission.
    before each SLSS/PSBCH transmission, the UE shall evaluate the duty cycle in the past 1 second taking into account the upcoming SLSS/PSBCH transmission. If the evaluation result exceeds the maximum duty cycle limit, the UE shall skip the SLSS/PSBCH transmission.

In this document, the UE transmitter behavior under congestion control in V2X sidelink is discussed.

Observations:
  According to draft ETSI EN 302 571 V2.0.0 (2016-March) [Reference 1] [Reference 2], the minimum $T_{off}$ limit is 25 ms or higher and can be up to 1 second depending on the current channel occupancy level.

Proposals:
  In order to comply with the radio layer $T_{off}$ requirement, which does not differentiate the type of transmissions, UE has to coordinate transmissions of SA/Data and some signaling (SLSS/PSBCH) from RAN1 perspective.

Proposals:
  In order to comply with the regulatory $T_{off}$ requirement, which is typically larger than 25 ms, the SA and its associated data shall be FDMed in the same subframe.

Proposals:
  The specifications should allow the UE to prioritize data transmissions over SLSS/PSBCH transmissions in order to meet the $T_{off}$ and duty cycle limits. More specifically,
    if an upcoming SLSS/PSBCH transmission is going to occur within the $T_{off}$ limit before a scheduled or reserved data transmission, the UE shall skip the SLSS/PSBCH transmission.
    if a data transmission is scheduled or performed within the $T_{off}$ limit before an upcoming SLSS/PSBCH transmission, the UE shall skip the SLSS/PSBCH transmission.
    before each SLSS/PSBCH transmission, the UE shall evaluate the duty cycle in the past 1 second taking into account the upcoming SLSS/PSBCH transmission. If the evaluation result exceeds the maximum duty cycle limit, the UE shall skip the SLSS/PSBCH transmission.

APPENDIX A

In the clause 4.2.10 on decentralized congestion control of [Reference 1] [Reference 2] the following limits are specified.

The equipment testing for DCC conformance shall focus on the $T_{on}$, $T_{off}$ and the duty cycle parameters where $0 < T_{on} \leq T_{on\_max}$, $T_{off\_min} \leq T_{off} \leq 1000$ and the values in Table 11 shall not be exceeded.

TABLE 11

Limits for the maximum utilization of a single channel by the equipment

| Parameters | Value |
| --- | --- |
| $T_{on\_max}$ | 4 milliseconds |
| $T_{off\_min}$ | 25 milliseconds |
| duty cycle | 3% |

When the CBR is $\leq 62\%$, $T_{off}$ is equal to $T_{off\_min}$. When the CBR is $>62\%$, $T_{off}$ time shall be determined with Equation 2.

$$T_{off} = T_{on} \times (4000 \times [(CBR-0.62)/CBR] - 1), \qquad (2)$$

NOTE: The rationale behind Equation 2 is outlined in ETSI TS 103 175 V1.1.1 (2015-June), Equation 1 in Clause 7.2.

Information is provided below regarding references mentioned herein.

[1] Draft ETSI EN 302 571 V2.0.0 (2016-03), Radiocommunications equipment operating in the 5 855 MHz to 5 925 MHz frequency band; Harmonized Standard covering the essential requirements of article 3.2 of Directive 2014/53/EU URL: http://www.etsi.org/deliver/etsi_en/302500_302599/302571/02.00.00_20/en_302571v020000a.pdf

[2] Revision proposal of Clause 4.2.10 of Draft ETSI EN 302 571 V2.0.0 (2016 March), URL: https://docbox.etsi.org/ERM/ERMTG37/05-CONTRIBUTIONS/2016//ERMTG37(16)000039_Revised_Clause_4_2_10_with_track_changes.docx (last accessed on 7 Aug. 2016)

[3] R1-166955, Congestion Control Framework for V2V, Ericsson

[4] R1-166951, Outstanding Physical Layer Structure Details and Receiver Behavior for Sidelink V2V, Ericsson

[5] R1-166960, Distributed Synchronization Procedure for V2X over PCS, Ericsson

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a wireless communication device providing sidelink communications with other wireless devices, the method comprising:
   scheduling a first transmission from the wireless communication device, wherein the first transmission has a first priority;
   scheduling a second transmission from the wireless communication device, wherein the second transmission has a second priority, wherein the first priority is greater than the second priority, and wherein the first and second transmissions are scheduled for transmission during a time interval;
   transmitting the first transmission during the time interval; and
   responsive to determining a violation of a timing limit corresponding to scheduling the first and second transmissions during the time interval and responsive to the first priority being greater than the second priority, dropping transmitting the second transmission during the time interval.

2. The method of claim 1, wherein the first transmission is a data transmission and the second transmission is a signaling transmission.

3. The method of claim 2, wherein the signaling transmission is a periodic signaling transmission that is scheduled for periodic transmission according to a defined period, and wherein dropping transmitting the second transmission during the time interval comprises skipping one instance of periodic transmission of the periodic signaling transmission.

4. The method of claim 3, wherein the time interval is a first time interval and the data transmission is a first data transmission, the method further comprising:
responsive to dropping transmitting the periodic signaling transmission during the first time interval, scheduling the periodic signaling transmission for transmission during a second time interval after the first time interval according to the defined period;
scheduling a second data transmission from the wireless communication device, wherein the second data transmission has the first priority, wherein the second data transmission is scheduled for transmission during the second time interval;
responsive to determining a violation of a timing limit corresponding to scheduling the periodic signaling transmission and the second data transmission during the second time interval, determining a number of previously scheduled transmissions of the periodic signaling transmission that have been skipped;
responsive to the number of previously scheduled transmissions of the periodic signaling transmission that have been skipped exceeding a threshold, transmitting the periodic signaling transmission during the second time interval; and
responsive to the number of previously scheduled transmissions of the periodic signaling transmission that have been skipped exceeding the threshold, dropping transmitting the second data transmission during the second time interval.

5. The method of claim 4 further comprising:
responsive to the number of previously scheduled transmissions of the periodic signaling transmission that have been skipped exceeding the threshold, rescheduling the second data transmission for transmission after the second time interval; and
responsive to determining compliance with a timing limit corresponding to scheduling the second data transmission after the second time interval, transmitting the second data transmission after the second time interval.

6. The method of claim 1 further comprising:
before dropping transmitting the second transmission, determining the timing limit corresponding to scheduling the first and second transmissions during the time interval.

7. The method of claim 6 wherein determining the timing limit comprises determining the timing limit based on a time off value defining a minimum time between two consecutive transmissions from the wireless communication device, and wherein determining the timing limit comprises determining the timing limit based on a duty cycle value defining a fraction of a period of time that the wireless communication device is allowed to transmit.

8. The method of claim 6, wherein determining the timing limit comprises determining the timing limit based on a measurement of a channel occupancy level.

9. The method of claim 8 wherein the measurement of the channel occupancy level comprises a Channel Busy Ratio, CBR.

10. A wireless communication device comprising:
a transceiver configured to provide wireless communication over a radio interface; and
a processor coupled to the transceiver, wherein the processor is configured to,
schedule a first transmission from the wireless communication device, wherein the first transmission has a first priority,
schedule a second transmission from the wireless communication device, wherein the second transmission has a second priority, wherein the first priority is greater than the second priority, and wherein the first and second transmissions are scheduled for transmission during a time interval,
transmit the first transmission during the time interval, and
drop transmitting the second transmission during the time interval responsive to determining a violation of a timing limit corresponding to scheduling the first and second transmissions during the time interval and responsive to the first priority being greater than the second priority.

11. The wireless communication device of claim 10, wherein the first transmission is a data transmission and the second transmission is a signaling transmission.

12. The wireless communication device of claim 11, wherein the signaling transmission is a periodic signaling transmission that is scheduled for periodic transmission according to a defined period, and wherein dropping transmitting the second transmission during the time interval comprises skipping one instance of periodic transmission of the periodic signaling transmission.

13. The wireless communication device of claim 12, wherein the time interval is a first time interval and the data transmission is a first data transmission, and wherein the processor is further configured to,
schedule the periodic signaling transmission for transmission during a second time interval after the first time interval according to the defined period responsive to dropping transmitting the periodic signaling transmission during the first time interval,
schedule a second data transmission from the wireless communication device, wherein the second data transmission has the first priority, wherein the second data transmission is scheduled for transmission during the second time interval,
determine a number of previously scheduled transmissions of the periodic signaling transmission that have been skipped responsive to determining a violation of a timing limit corresponding to scheduling the periodic signaling transmission and the second data transmission during the second time interval,
transmit the periodic signaling transmission during the second time interval responsive to the number of previously scheduled transmissions of the periodic signaling transmission that have been skipped exceeding a threshold, and
drop transmitting the second data transmission during the second time interval responsive to the number of previously scheduled transmissions of the periodic signaling transmission that have been skipped exceeding the threshold.

14. The wireless communication device of claim 13, wherein the processor is further configured to,
reschedule the second data transmission for transmission after the second time interval responsive to the number of previously scheduled transmissions of the periodic signaling transmission that have been skipped exceeding the threshold, and transmit the second data transmission after the second time interval responsive to determining compliance with a timing limit corresponding to scheduling the second data transmission after the second time interval.

15. The wireless communication device of claim 10, wherein the processor is further configured to,
determine the timing limit corresponding to scheduling the first and second transmissions during the time interval before dropping transmitting the second transmission.

16. The wireless communication device of claim 15, wherein determining the timing limit comprises determining the timing limit based on a time off value defining a minimum time between two consecutive transmissions from the wireless communication device, and wherein determining the timing limit comprises determining the timing limit based on a duty cycle value defining a fraction of a period of time that the wireless communication device is allowed to transmit.

17. The wireless communication device of claim 15, wherein determining the timing limit comprises determining the timing limit based on a measurement of a channel occupancy level.

18. The wireless communication device of claim 17, wherein the measurement of the channel occupancy level comprises a Channel Busy Ratio, CBR.

19. A computer program product comprising:
a computer readable storage medium having computer readable program code embodied in the computer readable storage medium that when executed by a processor of a wireless communication device causes the wireless communication device to perform operations comprising:
scheduling a first transmission from the wireless communication device, wherein the first transmission has a first priority,
scheduling a second transmission from the wireless communication device, wherein the second transmission has a second priority, wherein the first priority is greater than the second priority, and wherein the first and second transmissions are scheduled for transmission during a time interval,
transmitting the first transmission during the time interval, and
dropping transmitting the second transmission during the time interval responsive to determining a violation of a timing limit corresponding to scheduling the first and second transmissions during the time interval and responsive to the first priority being greater than the second priority.

* * * * *